United States Patent [19]

Paar

[11] Patent Number: 4,539,372
[45] Date of Patent: Sep. 3, 1985

[54] CATIONIC PAINT BINDERS AND PROCESS FOR PRODUCING SAME

[75] Inventor: Willibald Paar, Graz, Austria

[73] Assignee: Vianova Kunstharz, A.G., Werndorf, Austria

[21] Appl. No.: 563,562

[22] Filed: Dec. 20, 1983

[30] Foreign Application Priority Data

Dec. 20, 1982 [AT] Austria .................................. 4600/82

[51] Int. Cl.³ .................................................. C08F 8/32
[52] U.S. Cl. ...................................... 525/128; 525/395; 525/399; 525/424; 525/440; 525/504; 525/528; 528/73
[58] Field of Search ............... 525/128, 395, 399, 424, 525/440, 504, 528; 528/73

[56] References Cited

U.S. PATENT DOCUMENTS

| | | | |
|---|---|---|---|
| 4,002,601 | 1/1977 | Hajek et al. ............................ | 528/73 |
| 4,278,580 | 7/1981 | Schmolzer et al. .................... | 528/73 |
| 4,282,128 | 8/1981 | Pampouchidis et al. ............. | 528/73 |
| 4,327,200 | 4/1982 | Leitner et al. ........................ | 528/111 |
| 4,349,655 | 9/1982 | Leitner et al. ........................ | 528/73 |

Primary Examiner—Bernard Lipman
Attorney, Agent, or Firm—A. W. Breiner

[57] ABSTRACT

Cationic resins suitable as binders for stoving coating compositions, particularly for application by electrodeposition, and as mill base resins for grinding pigments and extenders; and a process for producing same is described. The resins are produced through reaction of a resinous compound carrying hydroxyl groups with a monoisocyanate which is totally or partially the reaction product of a diisocyanate and a tertiary amine which carries the ring structure

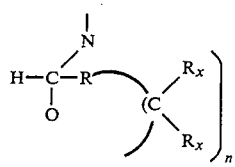

wherein R and $R_x$ are a hydrogen atom or an alkyl radical or an aryl radical which may be substituted and wherein n is 2 or 3, the quantity of basic component being chosen in order that the cationic resin has an amine value of at least 35, and preferably of from 40 to 140 mg KOH/g.

12 Claims, No Drawings

CATIONIC PAINT BINDERS AND PROCESS FOR PRODUCING SAME

The present invention is directed to cationic paint binders which, after protonation of their basic amino groups with inorganic or organic acids, become water-dilutable; and to a process of producing the binders. They may be used to particular advantage for cathodic electrodeposition (CED). A special application is their use in pigment pastes for the formulation of CED paints.

U.S. Pat. Nos. 4,349,655 and 4,327,200 disclose CED binders carrying oxazolidine groups as protonizable groups. These groups, according to the aforesaid patents, are introduced into hydroxy group containing polymers either through urethane linkages, i.e., via a mono-adduct of an N-hydroxyalkyloxazolidine and a diisocyanate, or by means of a dicarboxylic acid semiester of an N-hydroxyalkyloxazolidine.

A number of other background documents, some of them not yet published, for example U.S. patent application Ser. No. 433,984 filed Oct. 12, 1982, corresponding to European Patent Application No. 00 76955, published Apr. 20, 1983; U.S. patent application Ser. No. 503,027 filed June 10, 1983; Austrian Patent Specification No. 372,689, and German Patent Application P 33 24 960.1 filed July 11, 1983, disclose the introduction of basic groups into the epoxy resin molecules in the form of oxazolidine groups, either totally or partially, in various ways. Thus, hydroxy group carrying oxazolidines are reacted to advantage with the epoxy groups of the epoxy resins via a carboxy group remaining free after reaction with dicarboxylic acid anhydrides. The double ester bond linking the oxazolidine radical to the epoxy resin introduces into the molecule hydrophilic and, moreover, splitable groups which, in various cases, may have a negative effect on the properties of the products and on the paint films produced therefrom.

It has now been found that hydroxy-free 5- and 6-membered ring systems carrying the structure

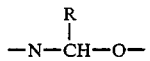

in the ring can be reacted with isocyanate groups. When using diisocyanates, compounds carrying one free NCO-group are obtained. The resultant monoisocyanates can be reacted in known manner with the hydroxy groups of polycondensation, polymerization, or polyaddition resins, whereby, with judicious selection of the weight ratios, products are obtained which, after protonation of the basic nitrogen groups, are water-dilutable paint binders.

Accordingly, the present invention is concerned with binders which are particularly suitable for use in coating compositions for cathodic electrodeposition, and to a process for producing such paint binders which are water-dilutable upon total or partial neutralization with inorganic and/or organic acids prepared from resinous hydroxy group containing polycondensation, polymerization, or polyaddition compounds and basic monoisocyanate compounds, characterized in that the monoisocyanate compound is the reaction product of a diisocyanate, preferably toluylene diisocyanate, and a tertiary amine which has the structure

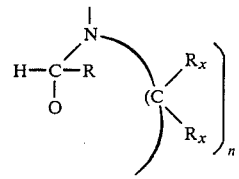

wherein R and $R_x$ are a hydrogen atom or an alkyl radical or an aryl radical which may be substituted, and wherein n is 2 or 3, the quantity of basic component being chosen to provide a product having an amine value of at least 35, and preferably of from 40 to 140 mg KOH/g.

Suitable resins for use according to this invention are hydroxy groups containing polycondensation, polymerization, or polyaddition resins prepared according to known principles. An essential condition for their suitability is the presence of a sufficient number of hydroxy groups for reaction with the monoisocyanate. A preferred group of basic resins are modified epoxy resins. In the literature such resins are understood to be the reaction products of resinous compounds carrying epoxy groups with compounds carrying active hydrogen atoms, such as carboxylic acids, amines, amides, etc.; the reaction products optionally being free of epoxy groups. Suitable resinous epoxy group carrying compounds with at least two 1,2-epoxy groups for use according to this invention are the known epoxy resins obtained through reactions of bisphenols, novolaks, glycols, and the like, with epichlorohydrin or methylepichlorohydrin. There is a variety of the aforesaid products commercially available and which have been described in detail in publications. Products based on bisphenol A or on novolaks with an epoxide equivalent weight of from 170 to 1000 are particularly preferred. Besides these, other resins carrying epoxy groups can be employed, such as copolymers containing glycidyl(meth)acrylate.

In order to obtain optimum crosslinking it is preferred that the polycondensation, polymerization, or polyaddition resins used according to this invention are those which carry polymerizable double bonds in addition to the hydroxy functional groups. The resins particularly preferred for use herein are the reaction products of epoxy resins with unsaturated carboxylic acids such as the epoxy acrylates, or reaction products of carboxy group containing copolymers with glycidyl(meth)acrylate, or unsaturated polyester resins.

The monoisocyanate adducts reacted according to the present invention with the hydroxy groups of the starting resins are obtained through reaction of a diisocyanate with a cyclic tertiary amine, the tertiary amine having a structure of the formula

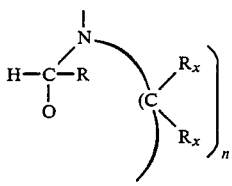

wherein the radicals R and $R_x$ stand for a hydrogen atom or an alkyl radical or an aryl radical, optionally substituted, the index n being 2 or 3. Compounds defined by the formula are known as oxazolidines in the event n=2, i.e., 5-members in the ring, or as perhydro-1,3-oxazines in the event n=3, i.e., 6-members in the ring.

The preparation of the above N-substituted compounds particularly suited for carrying out the invention can be effected in a simple manner and according to various methods. When using N-substituted secondary ethanol- or propanolamines, the ring is closed with aldehydes, the desired ring-functional oxazolidine or perhydro-1,3-oxazine forming:

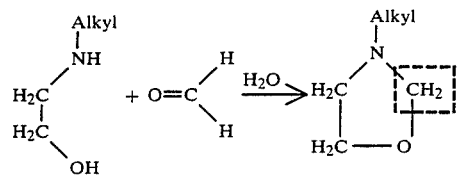

Suitable substituted amines for the reaction, in addition to N-alkyl-substituted ethanol- or propanolamines, are aminoalkylsubstituted ethanol- or propanolamines, such as aminoethylethanolamine or aminoethylpropanolamine, or substances of similar structure. It is understood that primary amino groups must be present in blocked form prior to reaction, for example as ketimines. Alternatively, blocking the primary amino groups may be effected through addition of (meth)acrylic compounds to β- or γ-hydroxy-functional primary amines as follows:

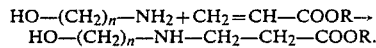

Further, in addition to the normal primary alkanol amines, substituted compounds such as 2-phenyl-2-hydroxy-ethylamine can be used. Suitable acrylic monomers, in addition to the homologous esters of acrylic acid or methacrylic acid with monoalcohols, are monomers carrying tertiary amino groups, such as dimethylaminoethylacrylate and its homologues.

A further method of preparing suitable secondary alkanol amines is the reaction of primary alkyl amines with monoepoxy compounds according to the reaction

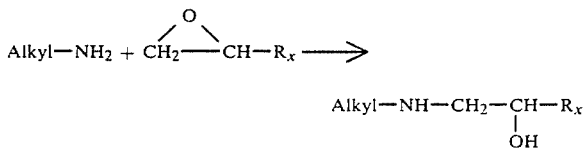

Suitable primary alkyl amines for use in forming the secondary alkanol amines are the normal straight-chain or branched alkyl amines, including the fatty amines, as well as primary/tertiary amines such as dialkylaminoalkylamines, such as dimethyl- or diethylaminopropylamine. Suitable monoepoxy compounds for use in the reaction are glycidyl esters of carboxylic acids, such as Cardura ®E (the glycidyl ester of branched C9-C11 monocarboxylic acids) or glycidylmethacrylate, glycidyl ethers, such as butylglycidyl ether, phenylglycidyl ether, p.-tertiary butylphenol glycidyl ether or allyl glycidyl ether or hydrocarbon oxides, for example the olefin oxides such as

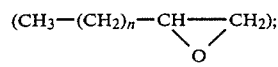

or

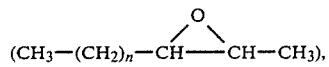

exemplified by octylene oxide, styrene oxide, or cyclohexenevinylmonoxide.

Suitable aldehydes for use in closing the ring are aliphatic or aromatic aldehydes such as formaldehyde and its homologues, benzaldehyde, anisaldehyde, and salicylaldehyde.

The methods of preparation of the various representatives of the tertiary amines used for carrying out the present invention are described in detail in the experimental section of the present specification. Blends of various types of these compounds may be produced through joint reaction of various hydroxyamines with aldehydes.

The tertiary cyclic amines thus obtained are subsequently reacted with a diisocyanate in a weight ratio selected in order that only half of the isocyanate groups present react. During reaction, the temperature must not exceed 30° C. It is of advantage to slowly add the amine to the isocyanate to prevent, on the one hand, strong exothermic reaction and, on the other hand, a concentration of free amine which would be unduly high. Furthermore, it is of advantage to dilute the blend of diisocyanate and amine with an isocyanate-inert solvent. For this purpose esters, ketones, aromatic hydrocarbons, etc., or blends thereof may be used. Time of addition should not exceed one hour, preferably 30 minutes. Preferably, the adduct is further processed immediately after the addition is finished.

Suitable diisocyanates are the known and commercially available aromatic, cycloaliphatic, and aliphatic diisocyanates. Toluylene diisocyanate, isophorone diisocyanate, hexamethylene-1,6-diisocyanate, and the like, are the preferred compounds.

The isocyanate monoadduct as above prepared is reacted with a hydroxyfunctional polycondensation, polymerization, or polyaddition resin to form a binder which becomes water-soluble upon partial or total neutralization of the basic groups, and which for satisfactory dilutability should have an amine value of between 35 and 100 mg KOH/g. The reaction is carried out at temperatures of from 20° to 120° C., optionally in the presence of isocyanate-inert solvents, the reaction being finished within a short time, even without catalysts. The progress of the reaction is monitored by determining the NCO-value which should be below about 0.1% when the reaction is terminated. After the reaction is completed, the binder can be diluted with the commonly employed solvents.

Optionally, the starting resins, prior to or after reaction with the monoadducts used according to the invention, can be modified with isocyanate monoadducts of other constitution. Such modifying components can be reaction products of di- or polyisocyanates with alkyl- or alkanolamines (for increasing the basicity of the final products) or unsaturated hydroxy compounds such as hydroxyacrylates (for increasing the crosslinking density) or long chain hydroxy compounds or carboxylic acids (for enhancing leveling or flexibility of the films).

A technological simplification when reacting with various monoadducts consists in the joint preparation of the aforesaid intermediates, i.e., the monoadducts with hydroxyoxazolidines and the components used according to the invention are produced in one manufacturing step.

In a particularly preferred embodiment of the process, the binders prepared according to the invention, subsequent to completion are subjected to an acidic hydrolysis at from 50° to 80° C., whereby, as is assumed, a part of the oxazolidine rings is opened through the formation of substituted methylol groups. Through the aforesaid post-treatment, reactions are anticipated which otherwise occur in the finished paint or in the coating tank. For this purpose, the reaction product is treated for some hours at the indicated temperature with water and a portion of the acid which is thereafter used for neutralization.

The binders can be milled with pigments in known manner and, for the production of a material ready for application, they are, after partial or total neutralization with inorganic or organic acids to a pH-value of from 4 to 7, diluted with preferably deionized water, to a solids content of between 5% and 20% when used for electrodeposition. The binders prepared according to the invention show excellent dilutability with water, even with a low degree of neutralization. The coemployment of additives and auxiliary substances as well as the conditions for electrodeposition are known to those skilled in the art and need no further explanation. The products produced according to the invention are particularly suited as mill base resins for grinding the pigments. The methods involved are known to the expert and form no part of the present invention.

The following examples illustrate the invention without limiting its scope. All data given in parts or percentages refer to parts or percentages by weight unless otherwise stated. All data in the tables refer to the solids content.

The following abbreviations are used in the examples:

| MOLA | monoethanolamine |
| --- | --- |
| MIPOLA | monoisopropanolamine |
| MPOLA | monopropanolamine |
| BA | n-butylamine |
| HA | n-hexylamine |
| LA | laurylamine |
| ET | N—ethylethanolamine |
| APEA | aminopropylethanolamine |
| FA | paraformaldehyde, 91% |
| BZA | benzaldehyde |
| ANA | anisaldehyde |
| APHE | acetophenone |
| BUAC | butylacrylate |
| EHAC | 2-ethylhexylacrylate |
| EMAC | ethylmethacrylate |
| BUMAC | butylmethacrylate |
| GMAC | glycidylmethacrylate |
| EHGE | 2-ethylhexylglycidylether |
| AGE | allylglycidylether |
| MIBK | methylisobutylketone |
| TDI | toluylene diisocyanate (isomer blend) |
| IPDI | isophorone diisocyanate |
| EGL | ethylene glycol monoethyl ether |
| DGDME | diethyleneglycol dimethylether |
| EGAC | ethylene glycol monoethylether acetate |
| AS | formic acid |
| ES | acetic acid |

PREPARATION OF THE INTERMEDIATES USED IN THE EXAMPLES

1. Preparation Of Cyclic Tertiary Amines (CTA)

1.1 Through ring formation with an aldehyde of N-substituted secondary ethanol- or propanol amines, at 80° to 120° C., with azeotropic separation of the reaction water, a compound of Formula (I) resulting

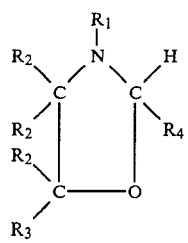

or the corresponding 6-membered ring
wherein
$R_1$ is an alkyl radical with from 1 to 4 C-atoms,
$R_2$ is a hydrogen atom or a $CH_3$-group,
$R_3$ is a hydrogen atom, an alkyl radical or a phenyl radical,
$R_4$ is a hydrogen atom, an alkyl radical with from 1 to 12 C-atoms or an optionally substituted aryl radical.

1.2. From aminoalkyl substituted ethanol- or propanolamines, the primary amino groups of which are blocked through ketimine formation. The amine is charged to a reaction kettle, and at 30° to 60° C., the ketone is added, while the batch is cooled. Subsequently, at 80° to 120° C., the reaction water is removed by azeotropic distillation. The ring formation with the aldehyde is formed in the manner described above to provide a compound with the formula

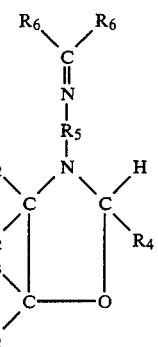

(Formula II)

wherein
$R_2$, $R_3$ and $R_4$ are as above defined, and
$R_5$ is a straight-chain or branched cyclic alkylene radical with from 2 to 12 C-atoms or an aralkyl radical, and
$R_6$ is a straight-chain or branched alkyl radical with from 1 to 4 C-atoms, an aryl radical or a hydrogen atom, or, jointly for both $R_6$ groups, a ring-forming alkylene radical optionally substituted with alkyl, aryl or alkoxy radicals.

1.3. From β- (or γ-hydroxy functional primary amines, the primary amine groups of which have been reacted with a (meth)acrylic compound. In producing this intermediate, in the first step, the (meth)acrylate is added to the amine at 30° to 35° C., while cooling. The reaction is completed by reacting further at 70° to 80° C. or above (preferably at 140° C., in the event methacrylates are used) for a period of from 1 to 3 hours. Then, at 70° to 80° C., the aldehyde is added and the ring is closed at 80° to 120° C., while entraining the reaction water with an azeotropic agent, to provide a compound with the formula

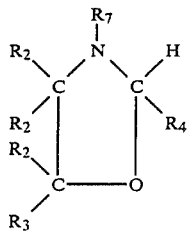

(Formula III)

wherein $R_2$, $R_3$ and $R_4$ are as above defined, and $R_7$ is a radical remaining after the reaction with an active hydrogen atom of an acrylic or methacrylic monomer monofunctional with regard to the double bond.

1.4. Through reaction with monoepoxide compounds and secondary alkyl-alkanol amines derived from primary alkyl amines. Thus, the monoepoxide compound is added at 60° to 120° C. to the amine during a period of from 1 to 2 hours. The reaction is completed by maintaining the temperature for another 3 hours. The ring formation with the aldehyde is the manner above provides a 5-membered cyclic amine of the formula

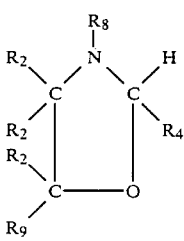

(Formula IV)

wherein $R_2$ and $R_4$ are as above defined, and $R_8$ is a straight-chain or branched alkyl radical with from 2 to 18 C-atoms, a cycloalkyl radical or an aralkyl radical or a tertiary amino group carrying the aforesaid groups, and $R_9$ is a saturated or unsaturated aliphatic, cycloaliphatic or aromatic hydrocarbon radical, optionally carrying ether or ester groups.

Table 1 lists the starting materials (weight units) for the cyclic tertiary amines according to Formulas I to IV as used in the examples.

TABLE 1

| CTA | Formula | Amine | (Meth)acrylate | Monoepoxide | Ketone | Reaction Conditions h/°C. | Aldehyde |
|---|---|---|---|---|---|---|---|
| 1 | III | 61 MOLA | 128 BUAC | — | — | 1/70 | 33 FA |
| 2 | III | 75 MIPOLA | 184 EHAC | — | — | 2/75 | 106 BZA |
| 3 | III | 61 MOLA | 114 EMAC | — | — | 2/120 | 136 ANA |
| 4 | III | 61 MOLA | 184 EHAC | — | — | 1/75 | 106 BZA |
| 5 | III | 75 MPOLA | 184 EHAC | — | — | 1/70 | 33 FA |
| 6 | III | 75 MPOLA | 142 BUMAC | — | — | 2/140 | 136 ANA |
| 7 | IV | 73 BA | — | 186 EHGE | — | 2/120 | 33 FA |
| 8 | IV | 101 HA | — | 114 AGE | — | 1/110 | 106 BZA |
| 9 | IV | 73 BA | — | 142 GMA | — | 1/100 | 136 ANA |
| 10 | IV | 188 LA | — | 114 AGE | — | 2/130 | 33 FA |
| 11 | I | 89 ETOLA | — | — | — | | 136 ANA |
| 12 | II | 118 APEA | — | — | 120 APHE | | 106 BZA |

2. Preparation Of The Diisocyanate Monoadducts Used According To The Invention (DMI)

The diisocyanate monoadducts are prepared according to Table 2. Thus, the amine intermediate (CTA) is added within the listed time period and at the listed temperature (column headed Reaction Conditions). The reaction is carried out in the presence of solvents, type and quantity being also listed in Table 2.

TABLE 2

| DMI | Tert. Amine (CTA) | Diisocyanate | Reaction Conditions |
|---|---|---|---|
| 1 | 333 CTA 4 | 174 TDI | 30 min/25° C., 60% Xylol |
| 2 | 271 CTA 7 | 174 TDI | 30 min/25° C., 70% MIBK |
| 3 | 201 CTA 1 | 174 TDI | 30 min/25° C., 60% DGDME |
| 4 | 347 CTA 2 | 174 TDI | 30 min/25° C., 60% EGAC |
| 5 | 271 CTA 5 | 222 IPDI | 30 min/30° C., 60% Xylol |
| 6. | 335 CTA 6 | 174 TDI | 30 min/25° C., 80% DGDME |
| 7 | 303 CTA 8 | 222 IPDI | 30 min/30° C., 70% MIBK |
| 8 | 314 CTA 10 | 174 TDI | 30 min/25° C., 60% DGDME |
| 9 | 333 CTA 9 | 222 IPDI | 30 min/30° C., 70% Xylol |
| 10 | 293 CTA 3 | 174 TDI | 30 min/25° C., 70% DGDME |
| 11 | 207 CTA 11 | 174 TDI | 30 min/25° C., 60% DGDME |
| 12 | 302 CTA 12 | 174 TDI | 30 min/30° C., 60% Xylol |

3. Preparation Of The Basic Resins Used According To The Invention (BRI)

BRI I: A blend of 1100 g of a bisphenol A epoxy resin (epoxy equivalent 500) and 400 g of a bisphenol A epoxy resin (epoxy equivalent 200) is dissolved in 461 g of MIBK and reacted at 110° C. with 344 g of methacrylic acid, until an acid value of below 10 mg KOH/g is obtained.

BRI II: 700 g of an epoxy novolak (3.6 epoxy groups per molecule) and 252 g of acrylic acid are dissolved in 408 g of EGAC and reacted at 100° C., until an acid value of less than 3 mg KOH/g is obtained.

BRI III: A copolymer prepared in known manner in xylene from 300 g of styrene, 144 g of acrylic acid, 116 g of hydroxyethylacrylate and 130 g of hydroxyethylmethacrylate is reacted at 110° C. with 284 g of glycidylmethacrylate, until an acid value of below 5 mg KOH/g is obtained. The resin is diluted with xylene to a solids content of 80%.

BRI IV: 400 g of a bisphenol A epoxy resin (epoxy equivalent 200) are dissolved in 144 g of xylene and reacted at 110° C. with 158 g of an equimolar blend of acrylic and methacrylic acid, until an acid value of below 3 mg KOH/g is obtained.

EXAMPLES 1–12

The basic resins (BRI I–BRI IV) are reacted with the monoisocyanate adducts (DMI 1–DMI 12) in the ratios listed in Table 3 (all figures refer to resin solids). The reaction is carried out at 60°–70° C., in a 70% solution (additional solvent EGAC) to an NCO-value of below 0.1%. The resins are further diluted to a solids content of 60% with EGL.

TABLE 3

| | Basic Resin (BRI) | Examples 1–12 Isocyanate Adduct (DMI) | AZ | NEUTR. |
|---|---|---|---|---|
| 1 | 1844 BRI I | 1521 DMI 1 | 51 | 30 AS |
| 2 | 952 BRI II | 1113 DMI 2 | 68 | 35 ES |
| 3 | 974 BRI III | 986 DMI 5 | 57 | 35 AS |
| 4 | 558 BRI IV | 701 DMI 10 | 67 | 40 AS |
| 5 | 952 BRI II | 1125 DMI 3 | 81 | 45 ES |
| 6 | 1844 BRI I | 1575 DMI 7 | 49 | 30 AS |
| 7 | 558 BRI IV | 878 DMI 8 | 70 | 35 AS |
| 8 | 974 BRI III | 1018 DMI 6 | 56 | 40 ES |
| 9 | 952 BRI II | 1303 DMI 4 | 62 | 35 AS |
| 10 | 974 BRI III | 555 DMI 9 | 37 | 30 AS |
| 11 | 558 BRI IV | 572 DMI 11 | 74 | 35 AS |
| 12 | 952 BRI II | 666 DMI 12 | 97 | 40 ES |

AZ = amine value mg KOH/g
NEUTR. = millimoles neutralizing agent for 1000 g of resin solids According to the preferred embodiment, the reaction product obtained as a solution, after addition of 10 millimoles (m Mol) of acetic acid per 100 g of resin solids, is diluted further with water to 60% and held at 50° to 70° C. for about three hours, while stirring. Prior to further processing, the binders may be diluted further with solvents such as diacetone alcohol or glycol ethers.

The necessary quantities of neutralizing agent are listed in Table 3. Hardness and water resistance are tested on clear films electrodeposited on untreated degreased steel panels and stoved for 30 minutes at 160° C. For testing the salt spray resistance the degreased untreated steel panels are coated with a pigmented paint (100 parts of resin solids, 16 parts of aluminum silicate pigment, 2 parts of carbon black, 2 parts of lead silicate) under conditions such as to obtain a dry film thickness of 16 to 20 μm after curing for 30 minutes at 160° C.

The evaluation of the clear films deposited at 280–300 Volt showed a film hardness of between 180 to 200 seconds according to DIN 53 157. Evaluation of water resistance (deionized water, 40° C.) showed the beginning of rust and blistering only after a soak time of 350 to 400 hours. Salt spray resistance according to ASTM B 117-64 showed rust creepage of less than 2 cm at the cross-incision (Scotch tape test) after 340 hours.

As will be apparent to one skilled in the art, various modifications can be made within the scope of the aforesaid description. Such modifications, being within the ability of one skilled in the art, form a part of the present invention and are embraced by the appended claims.

It is claimed:

1. Cationic resin comprising the reaction product of (1) a polymeric material containing hydroxy groups functionally reactive with an isocyanate group, and (2) a monoisocyanate compound, said monoisocyanate compound being the reaction product of a diisocyanate and a hydroxy-free tertiary amine, said amine having the structure

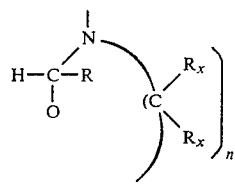

wherein R and $R_x$ are a hydrogen atom; an alkyl radical or an aryl radical and n is 2 or 3, the quantity of basic component being selected in order that the cationic resin is at least substantially free of —NCO groups and has an amine value of at least 35 mg KOH/g.

2. The cationic resin of claim 1 wherein said diisocyanate is toluene diisocyanate.

3. The cationic resin of claim 1 wherein said polymeric material is a polycondensation compound.

4. The cationic resin of claim 1 wherein said polymeric material is an addition polymer.

5. The cationic resin of claim 1 wherein said polymeric material is the reaction product of an epoxy resin with a member selected from the group consisting of a carboxylic acid, an amine, an amide, or mixtures thereof.

6. The cationic resin of claim 1 wherein said polymeric material is the reaction product of an epoxide resin with acrylic acid, or methacrylic acid, or mixtures thereof.

7. The cationic resin of claim 1 wherein said polymeric material is the reaction product of carboxyl group containing copolymers with glycidyl(meth)acrylate.

8. The cationic resin of claim 1 wherein the tertiary amine has the formula

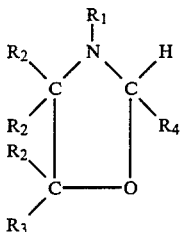

(I)

and/or

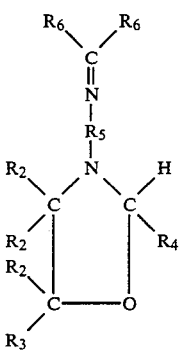

(II)

and/or

-continued

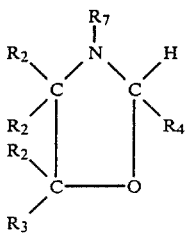
(III)

and/or

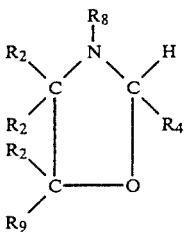
(IV)

and the corresponding 6-membered compounds where capable of being formed, wherein $R_1$ is an alkyl radical with from 1-4 C-atoms, $R_2$ is hydrogen or a $CH_3$ group, $R_3$ is hydrogen, an alkyl radical or a phenyl radical, $R_4$ is hydrogen, an alkyl radical with 1-12 C-atoms or an aryl radical which may be substituted, $R_5$ is a straight chain or branched or cyclic alkylene radical with 2-12 C-atoms or an aralkylene radical, $R_6$ is a straight chain or branched alkyl radical with 1-4 C-atoms, an aryl radical or hydrogen or, jointly for both of said $R_6$, a ring-forming alkylene radical, which may be substituted, $R_7$ is the radical remaining after reaction with an acidic hydrogen atom of an acrylic or methacrylic monomer monofunctional with regard to the double bond, $R_8$ is a straight-chain or branched alkyl radical with 2 to 18 C-atoms, a cycloalkyl radical, or an aralkyl radical or a tertiary amine group carrying said radicals, $R_9$ is a saturated or unsaturated aliphatic, cycloaliphatic or aromatic hydrocarbon radical, which may carry ether or ester groups.

9. The cationic resin of claim 5 wherein said cationic resin has an amine value of from about 40 to 140 mg KOH/g.

10. The cationic resin of claim 1 wherein said tertiary amine is obtained through ring formation with an aldehyde, water being split off, from at least one member of the group
 (a) an N-substituted ethanolamine or N-substituted propanolamine;
 (b) primary $\beta$-hydroxyethylamines or $\beta$-hydroxypropylamines or $\gamma$-hydroxyethylamines or $\gamma$-hydroxypropylamines, or a substituted derivative of said amines, after blocking the primary amino group as a ketimine or through reaction with acrylate monomers; and
 (c) reaction product of a primary alkyl amine with a monoepoxy compound.

11. The cationic resin of claim 1 wherein the components are selected to provide a resin containing a minimum of 0.8 chain end double bonds in 1000 molecular weight units to provide a self-crosslinking binder.

12. The cationic resin of claim 1 wherein said resin is treated with water for several hours at 50° to 80° C. in the presence of 10 millimoles of acid per 100 g of resin solids.

* * * * *